INVENTORS
GUSTAV GUANELLA and
PAUL GÜTTINGER
BY [signature]
ATTORNEY

INVENTORS
GUSTAV GUANELLA and
PAUL GÜTTINGER
BY

ATTORNEY

INVENTORS
GUSTAV GUANELLA and
PAUL GÜTTINGER
BY [signature]
ATTORNEY

Patented Jan. 22, 1952 2,583,484

UNITED STATES PATENT OFFICE 2,583,484

COMBINED ANGULAR VELOCITY AND PULSE MODULATION SYSTEM

Gustav Guanella, Zurich, and Paul Guttinger, Wettingen, Switzerland, assignors to Radio Patents Corporation, New York, N. Y., a corporation of New York Application November 22, 1946, Serial No. 711,537
In Switzerland December 15, 1945

7 Claims. (Cl. 179—15)

The present invention relates to signaling, more particularly to a novel method of and system for transmitting and receiving a plurality of signals simultaneously.

An object of the invention is to provide a system in which a plurality of signals, in particular a pair of messages or any other information may be transmitted on a single carrier.

More specifically, the invention concerns a method of and apparatus for duplex signal transmission by means of angular velocity modulated carrier waves, that is by either frequency or phase modulation.

Accordingly, a more specific object of the invention is to provide a method and system of this type enabling the transmission of at least two messages or signals by means of a single carrier wave substantially without increasing the frequency band width of the transmitting circuits or channel.

With the foregoing objects in view, the invention involves generally the transmission and reception of a carrier wave subjected simultaneously to a frequency or phase modulation in accordance with one signal or message to be transmitted, and to a pulse time or pulse position modulation in accordance with a second modulating signal or message to be transmitted.

In the realization of such a system and method, the phase or frequency modulated carrier is so controlled in amplitude by the impulse signals that the oscillations will never cease or become completely interrupted. In other words, the pulse modulation, contrary to standard practice, is so effected that the oscillations will not cease during the intervals between the pulses, but are merely reduced in amplitude. This reduction may for instance be ½ of the maximum carrier amplitude. However, this relation is by no means critical and may be varied in accordance with existing conditions and requirements. Thus, the degree of reduction may depend upon the characteristics of the receiver, in particular the design of the receiving circuits for the phase or frequency modulated signal component. Furthermore, the amplitude reduction during the pulse intervals at the transmitter should be maintained within such limitation that the amplitude limiter provided in the frequency modulation receiver is capable of effecting a sufficient amplitude compensation in such a manner as to prevent any residual pulse modulation superimposed upon the phase or frequency modulated signals. In other words, any residual pulse signals at the output of the limiter should be avoided. The receiver for the phase or frequency modulated signals may be of any known and standard type, provided it includes a suitable amplitude limiter having a sufficiently low time constant.

The separation of the impulse modulated signal component is effected, after suitable high frequency amplification of the received oscillations, preferably by the aid of a rectifier whose output current varies according to the enveloping curve of the received high frequency carrier and is a replica of the time modulated signal pulses, as is understood.

The time modulation of the signal pulses of constant amplitude may be effected in accordance with any of the known methods and by means of apparatus well known for this purpose. Thus, the width or duration of the pulses may be varied according to the instantaneous amplitude of the modulating signal, this method being known as pulse time modulation, or a pulse of constant width or duration may be changed in its position relative to the other transmitted pulses in accordance with the amplitude and frequency of an impressed voice or other modulating signal wave, this method being known in the art as pulse position modulation.

Accordingly, the invention provides the possibility to transmit at least two signals or messages upon a single carrier wave without the necessity of increasing the frequency band width for the transmitting circuits or channel. In this manner, a pair of telegraph, telephone, facsimile, teletypewriter or a combination of signals of this and similar types may be transmitted through a single communication channel of given frequency characteristic or band width.

The above and further objects as well as novel aspects of the invention will become more apparent from the following detailed description of a practical embodiment thereof taken in reference to the accompanying drawings forming part of this specification and wherein.

Like reference characters identify like parts throughout the different views of the drawings.

Figure 1:
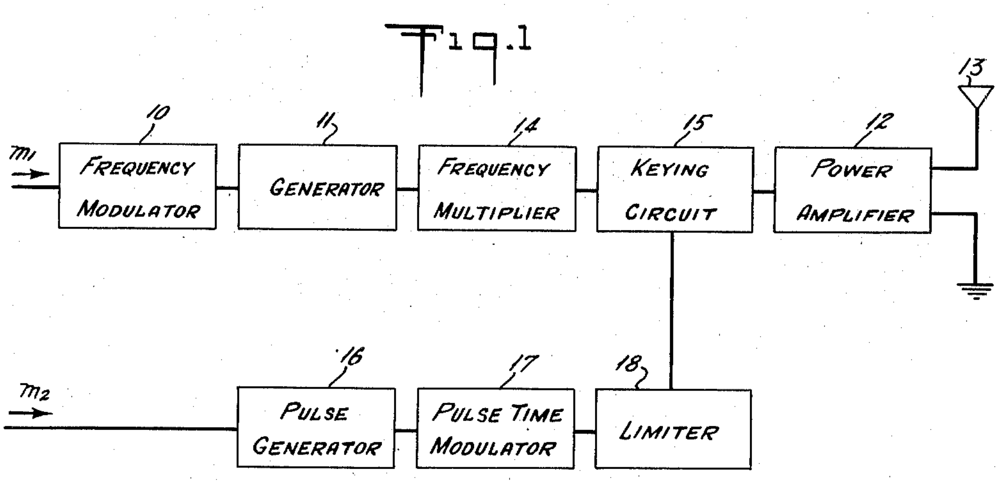
Fig. 1 is a block diagram illustrating a transmitting system for duplex signal transmission constructed in accordance with the principles of the invention.

Referring more particularly to Figure 1, a first signal wave $m_1$, such as a telegraph, facsimile, telephone or any other electric signal is applied to a frequency modulator 10 which in turn controls an oscillator or carrier frequency generator 11. Accordingly, the frequency of the generator 11 of substantially constant amplitude will be modulated in accordance with the signal amplitude variations, in a manner well understood. The frequency modulated oscillations after sufficient amplification by means of a power amplifier 12 serve to energize a utilization circuit such as antenna 13 shown in the drawing.

Between the generator 11 and the power amplifier 12, a frequency multiplier 14 may be arranged for converting a relatively low carrier frequency of the master oscillator to a desired frequency suitable for radiation by the antenna 13. The modulator 10, oscillator 11, multiplier 14, power amplifier 12 and antenna 13 thus constitute the frequency modulated section of the transmitter for transmitting a first low frequency or modulating signal $m_1$. Preceding the power amplifier 12, there is furthermore shown a keying circuit 15 for subjecting the frequency modulated oscillations to an additional impulse modulation in accordance with a second low frequency or modulating signal $m_2$ which also may be a telegraph, telephone, facsimile, teletypewriter or any other signal, as is understood.

Figure 5:
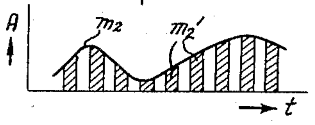
Fig. 5 is a curve illustrative of the generation of the pulse time modulated signal in Fig. 2.

In order to carry out the pulse modulation, the signals $m_2$, in the example shown, are first applied to a pulse generator 16 wherein they are converted into discrete amplitude modulated pulses $m_2'$, as shown in Figure 5. The amplitude modulated pulses are then converted into pulses of constant amplitude and varying width or duration in the pulse time modulator 17 and upon limiting in the amplitude limiter 18 serve to control the keying circuit 15. The number of the pulses per second should be relatively small compared with the carrier frequency produced by the oscillator 11. Furthermore, the pulse frequency should be at least 2 to 3 times higher compared with the highest frequency component of the modulating signal $m_2$. Any other known means for producing time modulated signal pulses, i. e. pulses which are either pulse time or pulse position modulated, may be employed for the purposes of the invention, as is understood.

The signal pulses supplied by the modulator 17 and applied to the keying circuit 15 serve to control the amplitude of the carrier oscillations in such a manner that during the pulse period or duration the power amplifier 12 passes a carrier signal of maximum amplitude. During the interval between the successive pulses the carrier voltage is reduced to a predetermined fraction of its maximum amplitude which may be ½ or any other fraction of the maximum carrier amplitude. In this manner, the frequency modulated carrier oscillations are subjected to an additional impulse pulse modulation in accordance with the low frequency signal $m_2$ without causing a complete interruption or cessation of the carrier oscillation. In practice, the control of the carrier wave by the keying circuit 15 may be effected by a variation of the grid bias voltage of an amplifying tube of the power amplifier. In this manner, any interference with the phase or frequency modulation of the carrier wave according to the signal $m_1$ is substantially avoided.

The output oscillations supplied by the power amplifier in Figure 1 are accordingly subjected to both frequency and impulse and modulation in accordance with the modulating signals $m_1$ and $m_2$, respectively. If desired, further amplifier or frequency multiplier stages may be provided in accordance with standard practice.

Figure 3:
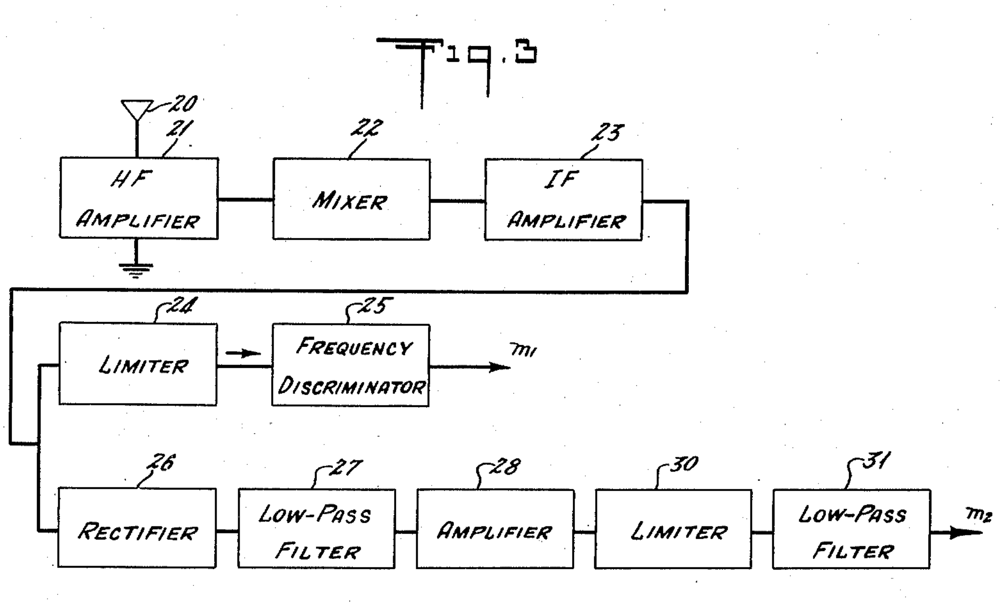
Fig. 3 is a block diagram showing the construction of a receiving circuit suitable for cooperating with the transmitter shown in Fig. 1.
Figure 4:
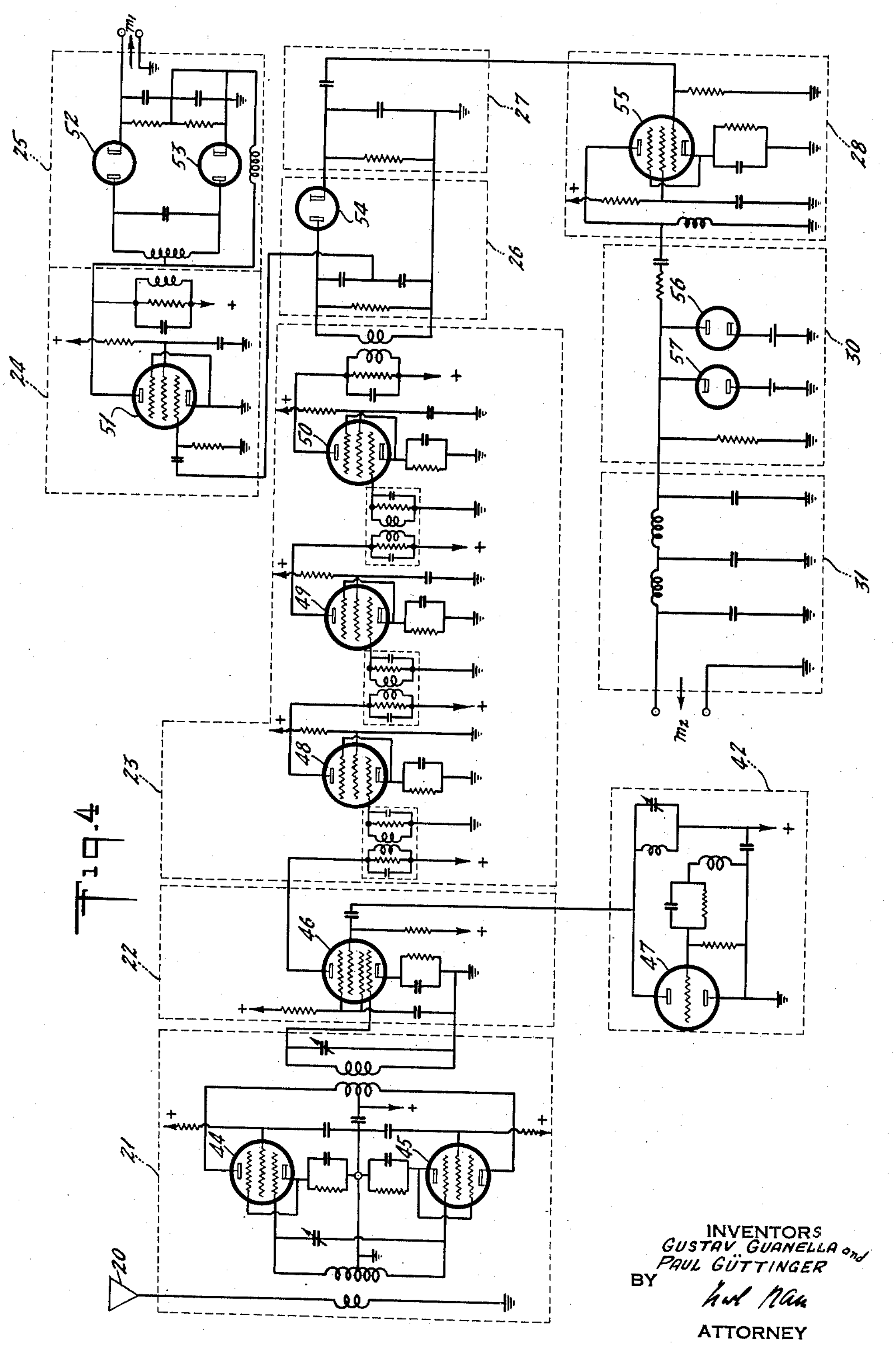
Fig. 4 is a detailed circuit diagram of the receiver according to Fig. 3.

Referring to Figure 3, there is shown a block diagram of a receiver suitable for cooperation with the transmitter according to Figure 1. A detailed receiving circuit of this type is shown in Figure 4. The signals intercepted by the receiving antenna 20 are applied in a known manner to a high frequency amplifier 21 and from there are passed on to a frequency converter or mixer 22 followed by an intermediate frequency amplifier 23, all of which may be in accordance with standard construction of superheterodyne receivers well known in the art. The intermediate frequency signals, after sufficient amplification, are applied to separate receiving channels for demodulation of the frequency modulated and impulse time modulated components, respectively. The channel for the frequency modulated component may be of standard construction and in the example shown comprises an amplitude limiter 24 followed by a frequency discriminator 25 which produces a low frequency signal $m_1$ substantially corresponding to the modulating signal at the transmitter, in a manner well known and understood by those skilled in the art.

The demodulation channel for the impulse modulated signal component, in the example shown, comprises a rectifier 26 the output of which supplies a signal according to the amplitude enveloping curve of the high frequency carrier, i. e., corresponding to the modulated signal pulses. The high frequency components contained in the modulated pulses are removed by passing the signals through a low-pass filter 27. After further amplification of the filtered impulses in an amplifier 28 they are applied to an amplitude limiter 30 and finally to a converter or demodulator for reproducing the original low frequency or modulating signal $m_2$. This converter, in the case of pulse time modulation, may be in the form of a low-pass filter 31 for filtering out the high frequency components and being so designed as to yield the original modulating signal. For this purpose the limiting frequency of the filter 31 has such value as to pass the highest frequency component of the low frequency signal, as is understood.

Figure 2:
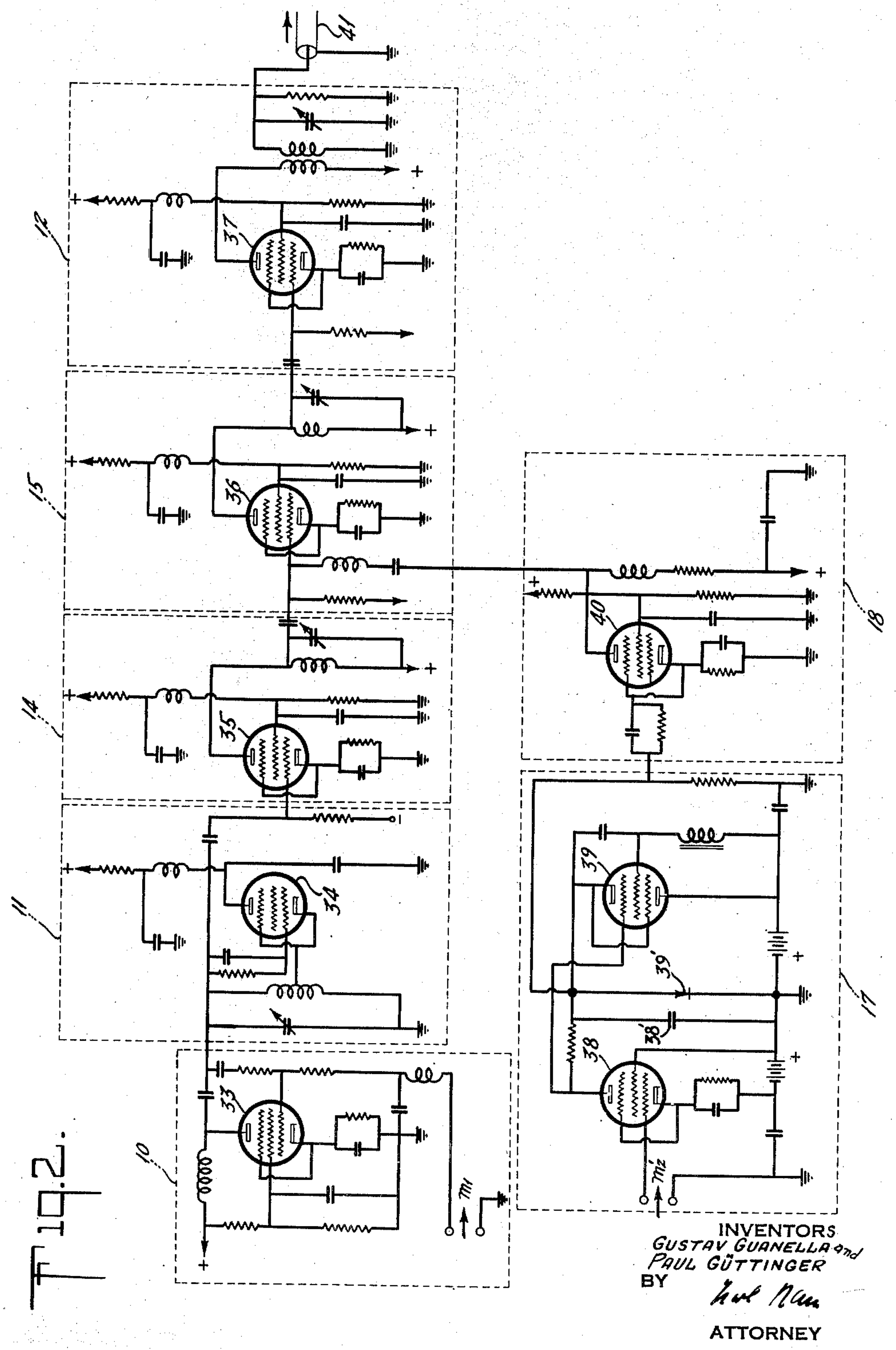
Fig. 2 is a more detailed circuit diagram of the system shown in Figure 1.

Referring to Figure 2, there is shown a complete circuit diagram of the transmitter according to Figure 1 comprising standard parts and circuits known and readily understood by those skilled in the art. Thus, the frequency modulator 10 comprises a so-called electronic reactance control tube 33 operatively connected to the generator 11 in the form of a standard regenerative vacuum tube oscillator tube 34. The frequency multiplier 14 comprises an amplifier tube 35 which is suitably negatively biased to produce a desired harmonic in its plate or output circuit. The keying circuit 15 comprises an amplifier tube 36 having its input grid controlled by the frequency modulated carrier voltage, on the one hand, and, by the keying impulses, on the other hand, in a manner described hereinabove. The power amplifier 12 comprising amplifier tube 37 may be of standard construction and may have a desired number of cascaded stages to produce a desired final output power applied to a concentric cable 41 feeding an antenna or other transmission channel.

As pointed out above, the keying circuit 15 constitutes an essential part of the transmitter shown in Figure 2. It may be so constructed and operated that the grid bias voltage of tube 36 varies between two fixed limits in accordance with the pulse voltage supplied by the output of the limiter 18. Alternatively, the bias voltage of either the screen grid or the suppressor grid of the tube 36 may be controlled by the signal pulses to effect the pulse modulation of the output carrier of the power amplifier. In this manner, the high frequency amplitude is merely controlled between a maximum and minimum limit value and a complete interruption or cessation of the carrier oscillation is avoided. The degree of reduction of the maximum power or carrier amplitude depends on existing conditions and operating requirements.

The impulse modulation may be produced in accordance with any of the known methods, as pointed out above. In Fig. 2, there is shown for this purpose a pulse time modulator 17 for converting the signal pulses $m_2'$ of varying amplitude (see Fig. 5) into corresponding pulses of constant amplitude and varying width or duration in accordance with the invention. In this modulator, the grid of an amplifier tube 38 is directly controlled by the amplitude modulated pulse voltage $m_2'$. Amplifier tube 38 has connected in series therewith a further amplifier tube 39, both tubes being connected in parallel to a condenser 38' which is shunted by a rectifier 39', from which the time modulated pulses are derived directly and applied to a further amplitude limiter 18 of known design.

Referring to Fig. 4 the complete receiving circuit diagram, assuming the use of pulse time modulation for the signal $M_2$, comprises a standard receiving circuit in the form of a push-pull high frequency amplifier 21 comprising a pair of amplifying tubes 44 and 45, a multi-grid electronic mixer 46 having associated therewith, a local oscillator 42 comprised of a regenerative oscillator tube 46, and a wide band intermediate frequency amplifier 23 comprising three tubes 48, 49 and 50 connected in cascade in a manner well understood. The frequency and pulse time modulated intermediate frequency signals supplied by the output stage of the amplifier 23 are applied to the frequency modulation and pulse time modulation receiving channels, respectively, the former comprising an amplitude limiter 24 in the form of a suitably biased vacuum tube 51 and a discriminator 25 of the well known balanced type comprising a pair of rectifier tubes 52 and 53 and supplying the demodulated output signal $m_1$, in a manner well understood by those skilled in the art.

The pulse time modulated component of the intermediate frequency signal is segregated from the latter by means of the rectifier 26 in the form of a diode or equivalent device and from there applied to a low-pass filter 27 of standard design, amplified by means of amplifier 28 comprising a single stage 55 shown in the drawings. The demodulation or conversion of the pulse signals into the original modulating signal $m_2$ is effected by means of a low-pass filter 31 after previous amplitude limitation in a limiter 30 shown to consist of a pair of suitably biased rectifiers 55 and 56 which are connected in parallel and in opposition with regard to their current passing directions. Other details for performing the various functions such as amplification, frequency conversion, amplitude, detection or demodulation etc. are well known and may conform to standard practice, detailed description having been omitted as being immaterial for and outside the scope of the present invention.

While the invention has been described with specific reference to the embodiment shown in the drawings, it is understood that various changes in the circuits, and of the parts or elements, as well as the substitution of equivalent elements or circuits for those shown for illustration, may be made in accordance with the broader spirit and scope of the invention as defined in the appended claims. The specification and drawings are accordingly to be regarded in an illustrative rather than in a limiting sense.

We claim:

1. A duplex signaling system comprising means for producing a substantially constant amplitude carrier oscillation being angular velocity modulated in accordance with a first modulating signal, means for converting a second modulating signal into constant amplitude signal pulses being time modulated according to said second modulating signal, and further means for additionally amplitude modulating said carrier oscillation between finite upper and lower amplitudes by said signal pulses.

2. A duplex signaling system comprising means for producing a substantially constant amplitude carrier oscillation being angular velocity modulated in accordance with a first modulating signal, means for converting a second modulating signal into constant amplitude signal pulses being time modulated according to said second modulating wave, further means for additionally amplitude modulating said carrier oscillation between finite upper and lower amplitudes by said signal pulses, means for transmitting and receiving the composite modulated oscillation, and amplitude limiting means for segregating angular velocity modulated component energy from the received oscillation.

3. A duplex signaling system comprising means for producing a substantially constant amplitude carrier oscillation being angular velocity modulated in accordance with a first modulating signal, means for converting a second modulating signal into constant amplitude signal pulses having widths modulated in accordance with said second modulating signal, and further means for additionally amplitude modulating said oscillation between finite upper and lower amplitudes by said signal pulses.

4. A duplex signaling system comprising means for producing a substantially constant amplitude carrier oscillation being frequency modulated in accordance with a first modulating signal, means for converting a second modulating signal into constant amplitude signal pulses being time modulated according to said second modulating signal, and further means for additionally amplitude modulating said carrier oscillation between finite upper and lower amplitudes by said signal pulses.

5. A duplex signaling system comprising means for producing a substantially constant amplitude carrier oscillation being frequency modulated in accordance with a first modulating signal, means for converting a second modulating signal into constant amplitude signal pulses having widths modulated according to said second modulating signal, and further means for additionally amplitude modulating said oscillation between finite upper and lower amplitudes by said signal pulses.

6. A duplex signaling system comprising a carrier frequency generator, a frequency modulator to vary the generated frequency in accordance with a first modulating signal, means for converting a second modulating signal into constant amplitude signal pulses having a width modulated in accordance with said second modulating signal, means for additionally amplitude modulating the frequency modulated carrier between finite upper and lower amplitudes by said signal pulses, means for transmitting and receiving the composite modulated carrier, amplitude limiting and frequency responsive means connected to said receiving means for reproducing said first modulating signal, and further means including a rectifier and pulse-modulation detector connected to said receiving means for reproducing said second modulating signal.

7. A duplex signaling system comprising a carrier frequency generator, a frequency modulator to vary the generated frequency in accordance with a first modulating signal, means for converting a second modulating signal into constant amplitude signal pulses having a width modulated in accordance with said second modulating signal, further means for additionally amplitude modulating the frequency modulated carrier between finite upper and lower amplitudes by said signal pulses, means for transmitting and receiving the composite modulated carrier, amplitude limiting and frequency responsive means connected to said receiving means for reproducing said first modulating signal, and further means including a rectifier and low-pass filter connected to said receiving means for reproducing said second modulating signal.

GUSTAV GUANELLA.
PAUL GUTTINGER.

REFERENCES CITED

The following references are of record in the file of this patent:

UNITED STATES PATENTS

| Number | Name | Date |
|---|---|---|
| 2,103,847 | Hansell | Dec. 28, 1937 |
| 2,272,070 | Reeves | Feb. 3, 1942 |
| 2,290,229 | Finch | July 21, 1942 |
| 2,342,943 | Kell | Feb. 29, 1944 |
| 2,361,437 | Trever | Oct. 31, 1944 |
| 2,406,019 | Labin | Aug. 20, 1946 |
| 2,427,500 | Houghton | Sept. 16, 1947 |
| 2,441,957 | DeRosa | May 25, 1948 |
| 2,462,874 | Labin et al. | Mar. 1, 1949 |
| 2,474,244 | Grieg | June 28, 1949 |

FOREIGN PATENTS

| Number | Country | Date |
|---|---|---|
| 541,665 | Great Britain | Dec. 5, 1941 |